United States Patent [19]

Simon

[11] Patent Number: 5,076,627
[45] Date of Patent: Dec. 31, 1991

[54] SCOOP FOR CAT LITTER

[75] Inventor: Allen Simon, East Northport, N.Y.

[73] Assignee: Four Pows Products Ltd., Hauppauge, N.Y.

[21] Appl. No.: 474,268

[22] Filed: Feb. 2, 1990

[51] Int. Cl.5 .......................... B07B 1/02; A01K 29/00
[52] U.S. Cl. ....................................... 294/1.3; 294/55; 294/131; 209/417
[58] Field of Search .............. 294/55, 1.3, 1.4, 49, 294/56, 59, 131; 119/1; 209/417, 418, 419; D30/161, 162; 15/257.1, 257.8

[56] References Cited

U.S. PATENT DOCUMENTS

| D. 233,158 | 10/1974 | Lowe | 294/55 X |
| D. 255,951 | 7/1980 | Halls et al. | 294/55 X |
| D. 256,173 | 7/1980 | Rigney | 294/55 X |
| 732,445 | 6/1903 | Rice | 15/257.8 |
| 830,016 | 9/1906 | Sims | 294/131 |
| 1,094,161 | 4/1914 | Mueller | 209/419 |
| 1,165,574 | 12/1915 | Davidson | 209/419 |
| 1,175,192 | 3/1916 | Tankersley | 294/131 |

Primary Examiner—Margaret A. Focarino
Assistant Examiner—Dean J. Kramer
Attorney, Agent, or Firm—Darby & Darby

[57] ABSTRACT

A scoop for use in removing waste material from cat litter comprises a shovel portion and a handle portion. The shovel portion includes a base panel, two side panels and a rear panel, with each of the panels including a multiplicity of elongated slots for straining the cat litter. The handle portion is connected to the rear panel of the shovel portion near the top and a protective shield extends downwardly from the upper surface of the rear panel at an acute angle. The protective shield extends a distance sufficient to minimize the likelihood of a person's hand from contacting cat litter as it is sifted through the slots in the rear panel.

2 Claims, 1 Drawing Sheet

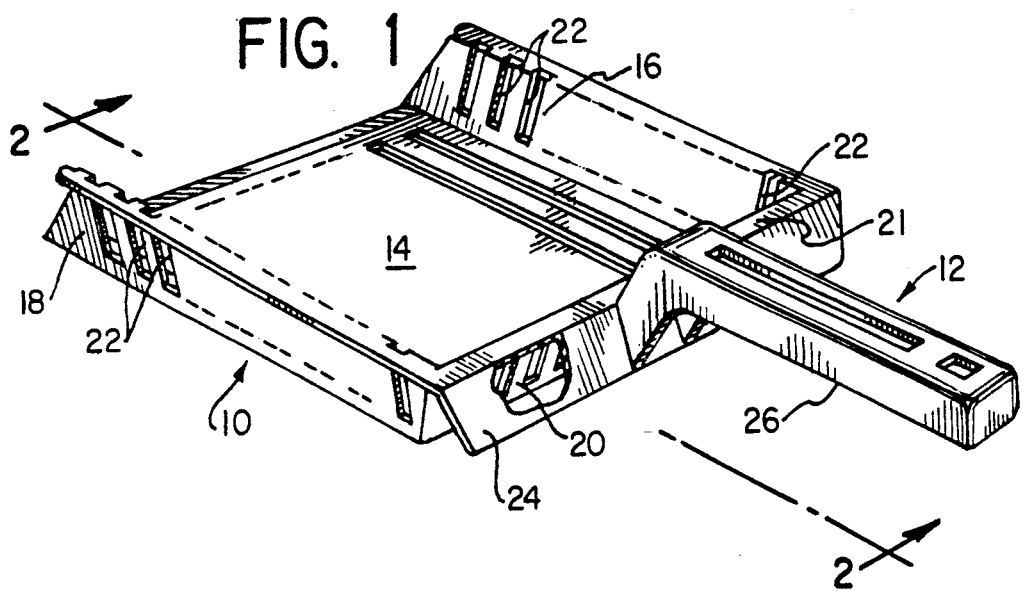
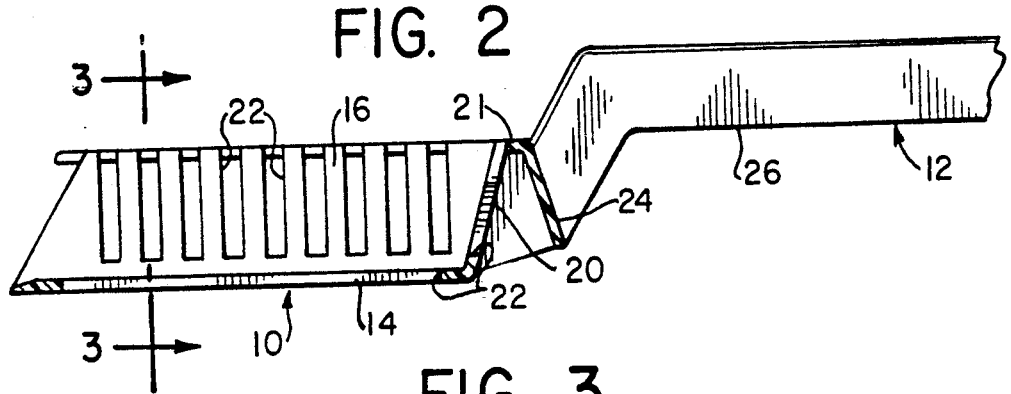
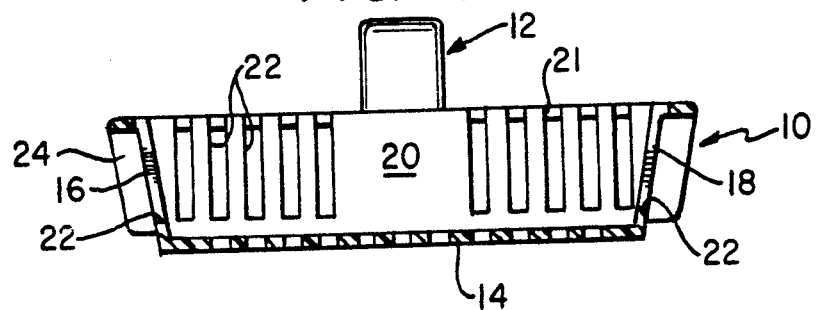

SCOOP FOR CAT LITTER

This invention relates to a scoop for removing waste material from cat litter.

The object of the invention is to provide a scoop for removing fecal and other waste material from cat litter which will minimize the likelihood of contact between the user's hand in which the scoop is grasped and the cat litter.

SUMMARY OF THE INVENTION

According to the invention, a scoop for use in straining waste material from cat litter comprises a shovel having openings in all of its surfaces through which the cat litter can be sifted. A handle is arranged so that it extends above the upper surface of the scoop. A shield at the rear surface of the scoop extends at an acute angle to a position where it minimizes the likelihood that the user's hand will touch the cat litter while it is being sifted.

BRIEF DESCRIPTION OF THE DRAWINGS

FIG. 1 is a perspective view of a scoop in accordance with the preferred embodiment of the invention;

FIG. 2 is a side sectional view along the line 2—2 of FIG. 1; and

FIG. 3 is a front sectional view along the line 3—3 of FIG. 2.

DETAILED DESCRIPTION OF THE INVENTION

In accordance with the invention, a scoop for removing waste material from kitty litter comprises a shovel portion 10 and a handle portion 12. In the preferred embodiment, the shovel portion 10 includes a generally square bottom panel 14, rectangular side panels 16 and 18, and a rear panel 20. The side panels 16 and 18 and rear panel 20 slope slightly with respect to the bottom panel 14 to increase capacity. A horizontal flange 21 extends around the upper periphery of shovel portion 10.

Each of the panels 14, 16, 18 and 20 includes a series of elongated slots 22 extending across a major portion of the panel. The purpose of these slots is to sift or strain waste material from the cat litter for disposal.

The construction as so far described is generally conventional. In order to provide maximum sifting, each of the panels should include slots 22 but because of the presence of the slots in the rear panel 18, a user's hand is likely to come into contact with the cat litter during use of the strainer. In order to avoid this, in accordance with the invention, a shield 24 extends from the upper surface of the flange formed at the top of the rear panel 18. The shield 24 extends at an acute angle with respect to the rear panel 18 so that maximum sifting action can be provided while still protecting the user from the kitty litter.

To further minimize unintended contact between the user's hand and the litter, the handle 12 extends upwardly with the bottom surface 26 of handle 12 preferably lying at or slightly above the upper surface of the horizontal flange 21.

What is claimed is:

1. A scoop for use in removing waste material from cat litter, comprising a shovel portion and a handle portion, said shovel portion comprising a base panel, two side panels and a rear panel, each of said panels including a multiplicity of elongated slots for straining the cat litter, said rear panel having an upper surface, said handle portion being connected to the rear of said shovel portion near the top thereof, said handle portion having a top and a bottom surface, and a protective shield extending downwardly from the upper surface of said rear panel and behind said rear panel, said protective shield being substantially entirely below the top surface of said handle and extending a distance sufficient to minimize the likelihood of a person's hand grasping the handle portion from contacting cat litter sifted through the slots in said rear panel.

2. A scoop for use in removing waste material from cat litter according to claim 1, wherein said handle portion is connected to said protective shield and extends upwardly with the bottom surface of the handle being no lower than the upper surface of the rear panel.

* * * * *